United States Patent Office 3,247,183
Patented Apr. 19, 1966

3,247,183
NEW PROCESS FOR THE MANUFACTURE OF YOHIMBANE COMPOUNDS
Johannes Mueller, Arlesheim, Switzerland, assignor to Ciba Corporation, New York, N.Y., a corporation of Delaware
No Drawing. Filed Aug. 23, 1963, Ser. No. 304,251
Claims priority, application Switzerland, Aug. 28, 1962, 10,171/62; July 12, 1963, 8,734/63
11 Claims. (Cl. 260—155)

The present invention provides a new process for the manufacture of 17α-hydroxy-18β-RO-20α-yohimbane-16β-carboxylic acid esters in which R stands for the acyl radical of an at least disubstituted benzoic acid, of their N-oxides and of salts of these compounds.

The afore-mentioned products of the present process, including the naturally occurring substances pseudoreserpine and raunescine, were however not accessible by the synthetic route to date. It was only possible to obtain in cumbersome manner a minor amount of pseudoreserpine and raunescine by extracting rauwolfia plants.

It is already known to esterify 17α:18β-dihydroxy-3β:20α-yohimbane-16β-carboxylic acid esters with aliphatic carboxylic acids containing fewer than 10 carbon atoms, or with benzoic acid, or with methylbenzoic acid (see U.S. specification 2,964,451 and J. Am. Chem. Soc. 79, pages 3763–3766 [1957]), but this is accompanied by the esterification of the hydroxyl group in position 17 and the hydroxyl group in position 18.

The present invention is based on the observation that the 18β-O-monoesters, that is to say the 17α-hydroxy-18β-RO-20α-yohimbane-16β-carboxylic acid esters in which R represents the acyl radical of an at least disubstituted benzoic acid, their N-oxides or the salts of these compounds are obtained by reacting 17α:18β-dihydroxy-20α-yohimbane-16β-carboxylic acid esters, their N-oxides or salts of these compounds with reactive functional derivatives of benzoic acids containing at least two substituents.

Functional derivatives of the afore-mentioned benzoic acids are more especially their halides, for example chlorides, or anhydrides. The reaction is advantageously performed in the presence of a diluent or solvent and under anhydrous conditions and, if desired, in the presence of an acid-binding condensing agent, for example of organic tertiary bases, more especially tertiary heterocyclic bases, such as pyridine, picoline, collidine or lutidine, or of a tertiary aliphatic amine such as trimethylamine, N:N-dimethyl-N-ethylamine, triethylamine or the like. Carbonates and bicarbonates of alkali and alkaline earth metals are likewise suitable as condensing agents. Liquid organic condensing agents or esterifying agents may at the same time serve as solvent, though it is also possible to use, for example, aromatic hydrocarbons such as benzene, toluene or xylene, or aliphatic hydrocarbons such as pentane or hexane as diluent. The reaction may be performed with cooling, at room temperature or, though less advantageously, at an elevated temperature, if desired in an inert gas, for example nitrogen.

To ensure that the hydroxyl group in position 18 is acylated as completely as possible, an excess of the carboxylic acid derivative is used, but this excess must not be too great since otherwise the hydroxyl group in position 17 is esterified to an increasing extent. It is of special advantage to use 1.5 to 2.2 mols of the carboxylic acid derivative for every mol of the yohimbane compound.

In the 17α:18β-dihydroxy-20α-yohimbane-16β-carboxylic acid esters, their N-oxides or salts to be used in the present process the 3-hydrogen atom may be in position α or β.

The 17α:18β-dihydroxy-20α-yohimbane-16β carboxylic acid esters contain the nucleus of the formula

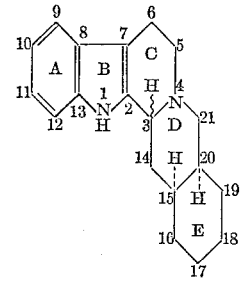

The above esters may contain further substituents, for example aliphatic hydrocarbon radicals, etherified or esterified hydroxyl groups, etherified mercapto groups, nitro or amino groups, halogen atoms and/or halogen-lower alkyl groups. These substituents are suitable primarily for positions 9–12 of the aromatic ring A, while for position 5 or 6 of the heterocycle C aliphatic hydrocarbon radicals are especially suitable.

Particularly suitable starting materials are compounds of the formula

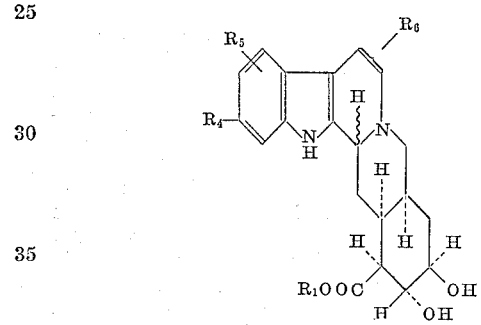

in which $R_1$ stands for an unsubstituted or substituted lower alkyl group, $R_4$ and $R_5$ each stands for a hydrogen atom, hydroxyl group, lower alkoxy group, lower alkyl group, lower alkylmercapto group, phenyl-lower alkoxy group, amino group, mono- or di-lower alkylamino group or halogen atom, or $R_4+R_5$ in vicinal positions form a methylenedioxy group and $R_6$ in position 5 or 6 represents a hydrogen atom or a lower alkyl group—their N-oxides or salts of these compounds.

Lower alkyl groups are more especially methyl, ethyl, propyl or butyl groups. Substituents of the alkyl radicals are more especially lower alkoxy, di-lower alkylamino or alkylene-imino groups which may be interrupted by hetero atoms such as oxygen, sulfur or nitrogen, being piperidino, pyrrolidino, morpholino, thiamorpholino or piperazino groups.

Lower alkoxy, alkylmercapto or di-lower alkylamino groups are more especially those in which the alkyl radicals are the afore-mentioned lower alkyl groups.

Derivatives of at least disubstituted benzoic acids to be used in the present process are, for example, derivatives of benzoic acids containing two to five, preferably three to five, substituents. Special preference is given to derivatives of benzoic acids containing four or preferably three substituents. The substituents are preferably in positions 3, or 4 and/or 5 of the benzoic acid radical. Suitable substituents are, for example, lower alkyls such as methyl, ethyl, propyl or butyl groups, free or substituted hydroxyl or amino groups, azo groups such as phenylazo groups, nitro groups, free or functionally converted carboxyl groups, halogen atoms or trifluoromethyl groups. Substituted hydroxyl groups are primarily lower alkoxy groups such as methoxy, ethoxy, propoxy or butoxy groups, methylenedioxy groups, or acyloxy groups such as lower-alkanoyloxy groups such as acetoxy, propionyloxy or butyryloxy groups, or lower alkoxycarbonyloxy groups such as methoxycarbonyloxy or ethoxycarbonyloxy groups, aminocarbonyloxy groups such as mono- or di-lower alkylamino-carbonyloxy groups, for example ethylamino-carbonyloxy, or phenylamino-carbonyloxy groups. Substituted amino groups are, for example, mono- or di-lower alkylamino groups such as methylamino, ethylamino, dimethylamino or diethylamino groups, or acylamino groups such as lower alkanoylamino groups, for example acetylamino, propionylamino or butyrylamino groups, or lower alkoxy-carbonylamino groups, such as methoxy- or ethoxy-carbonylamino groups. Functionally converted carboxyl groups are, for example, carbo-lower alkoxy groups such as carbomethoxy, carbethoxy, carbopropoxy or carbobutoxy groups, or carbamyl groups. Examples of such acids are: Veratric, piperonylic, 3:4 - dichlorobenzoic, 3:4:5 - trimethoxybenzoic, 5-amino-2-methoxybenzoic, 5-dimethylamino-2-methoxybenzoic, 3-ethoxy-carbonyloxy - 4 - methoxybenzoic, 3:4:5 - trimethylbenzoic, 3:4:5 - triethoxybenzoic, 3:4:5 - tri - n - propoxybenzoic, 3:4:5 - tri - n - butoxybenzcic, 3:4 - dimethoxy - 5 - hydroxybenzoic, 3:4 - dimethoxy-5-carbethoxybenzoic, syringic, O-acetyl-syringic, O-carbomethoxy-syringic, O-carbethoxy-syringic, O-carbopropoxy - syringic, O - carbobutoxy - syringic, O-carbisobutoxy - syringic, 2 - carboxy - 3:4:5:6 - tetrachlorobenzoic or 4-dimethylamino-carbonyloxy-3:5-dimethoxybenzoic acid.

The products of the present process display a sedative and/or hypotensive action and/or are valuable intermediates for the manufacture of compounds having a sedative or hypotensive action. Thus, for example, a resulting 11-methoxy - 17α - hydroxy - 18β - RO - 3β:20α - yohimbane-16β-carboxylic acid methyl ester—in which R represents the acyl radical of an at least disubstituted benzoic acid—may be etherified or esterified in known manner at the 17α-hydroxyl group to form the known sedatively and/or hypotensively active 11-methoxy-17α-methoxy-18β-RO-3β:20α-yohimbane-16β-carboxylic acid methyl esters (in which R has the above meaning) or the likewise active 11 - methoxy - 17α - acetyloxy - 18β - (3:4:5 - trimethoxybenzoyloxy) - 3β:20α - yohimbane - 16β - carboxylic acid methyl ester. A resulting 3α:20α-yohimbane compound can be converted in known manner into a 3β:20α-compound, for example by dehydrogenation and reduction of the resulting Δ³-double bond with zinc in the presence of an acid.

Accordingly, the active compounds of the present invention may be used as sedatives or tranquillisers for treating conditions of hyperactivity, tension or excitation or, as anti-hypertensives for treating increased blood pressure.

The new compounds and the starting materials used may be in the form of racemate mixtures, pure racemates or optical antipodes. Racemic final products may be resolved, for example, as follows: Racemic free bases—which may be dissolved for instance in a lower alkanol such as methanol, ethanol, propanol or isopropanol, or in a halogenated lower aliphatic hydrocarbon such as methylene chloride or chloroform—are reacted with an optically acid and the salts formed are isolated, for example according to their different solubilities, in the form of the diastereomers from which the antipodes of the new bases can be liberated by treatment with an alkaline agent. Especially frequently used optically active acids are the D-forms and L-forms of tartaric, di-ortho-toluyltartaric, malic, mandelic, 10-camphorsulfonic or quinic acid.

Racemic compounds of an acidic nature can be separated with the aid of optically active bases, for example brucine, strychnine, quinine, cinchonine or cinchonidine, according to the method referred to above.

Optically active forms of the afore-mentioned compounds can also be prepared by biochemical methods.

Depending on the reaction conditions and starting materials used the final products are obtained in free form or in the form of their N-oxides and/or their salts. Thus, for example, there may be obtained basic, neutral, acid or mixed salts, possibly also hemi-, mono-, sesqui- or polyhydrates thereof. The salts of the final products can be converted into the free bases in known manner. From the free bases there may be prepared salts by reaction with organic or inorganic acids capable of forming therapeutically useful salts. Such acids are, for example, hydrohalic, sulfuric or phosphoric acids, nitric or perchloric acid: aliphatic, alicyclic, aromatic or heterocyclic carboxylic or sulfonic acids, such as formic, acetic, propionic, oxalic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicyclic or para-amino-salicyclic acid, methanesulfonic, ethanesulfonic, hydroxy-ethanesulfonic, ethylenesulfonic acid; halogenbenzenesulfonic, toluenesulfonic, naphthalenesulfonic acid or sulfanilic acid; methionine, tryptophan, lysine or arginine.

The salts of the new compounds may also be used for purifying the resulting bases by converting the bases into salts, isolating the latter and liberating again the bases from these salts.

N-oxides of the final products can be prepared in known manner, for example by reacting an N-oxidizing agent upon the new ethers which are advantageously dissolved in an inert liquid. Suitable N-oxidants are, for example, hydrogen peroxide, ozone, persulfuric acid or preferably organic per-acids such as peracetic, perbenzoic, mono-perphthalic or para-toluene-persulfonic acid. The inert liquids used as solvent or diluent in the oxidation are, for example, halogenated lower alkanes, such as chloroform, methylene chloride or ethylene chloride, or lower alkanols such as methanol or ethanol. During the N-oxidation it is of advantage to prevent any excess of oxidizing agent and higher temperatures to make it impossible for oxidative changes of a different nature taking place.

A resulting N-oxide or salt thereof can be reduced, for example by treatment with hydrogen in the presence of a catalyst containing a metal of group VIII of the Periodic Table, such as Raney nickel, platinum oxide or palladium black, or nascent hydrogen such as is formed when a heavy metal, for example iron, zinc or tin, acts on an acid, for example on acetic acid.

The invention further includes any modification of the present process in which an intermediate obtainable at any stage of the process is used as starting material and any remaining step or steps is/are carried out, or the process is discontinued at any stage thereof, or in which the starting materials are formed under the reaction conditions.

The 17α:18β-dihydroxy-20α-yohimbane-16β-carboxylic acid esters and their N-oxides used as starting materials are partially known. They are obtained, for example, by alcoholysing a 16:18-lactone of a 17α:18β-dihydroxy-20α-yohimbane-16β-carboxylic acid or an N-oxide thereof. The alcoholysis is preferably performed by treatment with an alcohol, for example an alcohol of the formula $R_1OH$, in the presence of a basic catalyst that promotes the alcoholysis, above all an alkali metal alcoholate such as sodium or potassium alcoholate, of the alcohol used itself, for example in an inert solvent or, if desired, in the alcohol used as solvent. The reaction can be performed at room temperature or with cooling or heating.

The afore-mentioned 16:18-lactones can be manufactured, for example by hydrolysing a 16β-carbomethoxy-17α-methoxy-18-hydroxy-20α-yohimbane compound with hydrobromic acid of 48% strength, reacting the resulting 17α:18β-dihydroxy - 3α:20α - yohimbane-16β-carboxylic acid with N:N'-dicyclohexyl carbodiimide and, if desired, isomerizing the resulting 16:18-lactone of 17α:18β-dihydroxy-3α:20α-yohimbane-16β-carboxylic acid with aqueous formic acid or acetic acid to form the 16:18-lactone of 17α:18β-dihydroxy-3β:20α-yohimbane-16β-carboxylic acid.

The other starting materials are known or can be prepared by known methods.

The pharmacologically active compounds can be used, for example in the form of pharmaceutical preparations containing them or their salts in admixture or conjunction with an organic or inorganic, solid or liquid pharmaceutical excipient suitable for enteral or parenteral administration. Suitable excipients are substances that do not react with the new compounds, for example water, gelatine, lactose, starches, stearyl alcohol, magnesium stearate, talcum, vegetable oils, benzyl alcohols, gums, propylene glycol, polyalkylene glycols, white petroleum jelly, cholesterol or other known medicinal excipients. The pharmaceutical preparations may be, for example, tablets, dragees or capsules, or in liquid form solutions, suspensions or emulsions. They may be sterilized and/or contain auxiliaries such as preserving, stabilizing, wetting or emulsifying agents, solution promoters, salts for regulating the osmotic pressure or buffers. They may also contain other therapeutically valuable substances. The pharmaceutical preparations are formulated by known methods.

The amount of excipient to be used may vary within wide limits and depends above all on the form in which the medicament is administered.

The new compounds may also be used in the form of animal feedstuffs or of additives to animal feedstuffs, using, for example, the conventional extenders and diluents or feedstuffs respectively.

The following examples illustrate the invention.

*Example 1*

50 mg. of methylpseudoreserpate are dried in a high vacuum at 120° C. and then mixed in 2 ml. of anhydrous pyridine with 63 mg. of freshly distilled 3:4:5-trimethoxybenzoyl chloride while cooling with ice. The mixture is kept for 60 hours at room temperature while excluding moisture. The reaction mixture is freed from pyridine by repeated evaporation with toluene under vacuum and taken up in 50 ml. of ethylene chloride. This solution is extracted once with 20 ml. of 0.5 N-sodium hydroxide solution and then with 3 x 215 ml. of N-acetic acid, each acetic acid extract then being agitated with 2 x 30 ml. of ethylene chloride. The organic phases are combined, neutralized with sodium carbonate solution and washed with water, dried with sodium sulfate and evaporated to dryness under vacuum. The residue is recrystallized from aqueous methanol to yield pseudoreserpine melting at 252–254° C., which is identical with authentic pseudoreserpine.

The methylpseudoreserpate used as starting material can be prepared in the following manner:

200 g. of methylreserpate are dissolved in 1660 g. of hydrobromic acid of 48% strength in a 3-liter flask and the solution is heated for 4 hours at the boil under nitrogen, then concentrated to syrup consistency under vacuum, taken up in fresh methanol and water and evaporated to dryness under vacuum; this operation is repeated (twice) until the hydrobromic acid has been expelled, and the batch is then completely dried overnight under a high vacuum. The residue is dissolved in a total of 3 liters of methanol, filtered through diatomaceous earth (Hyflo), distributed over 4 flasks and methylated by slowly adding 3 liters of N-ethereal diazomethane solution and leaving the whole to itself for 24 hours.

When all diazomethane has been consumed, the ether is evaporated under diminished pressure and the addition of another 3 liters of ethereal diazomethane solution on each occasion is repeated. When the latter solution has been consumed, the ether is evaporated, then the solution is filtered through diatomaceous earth (Hyflo) and finally concentrated to a volume of 500 ml., upon which crystalline 11-methoxy-17α:18β-dihydroxy-3α:20α-yohimbane-16β-carboxylic acid methyl ester melting at 265° C. is obtained which is isolated by being suctioned off.

36 g. of the resulting methyl ester are suspended in a mixture of 900 ml. of methanol and 270 ml. of aqueous potassium carbonate solution of 40% strength and the whole is caused to dissolve by heating and stirring under nitrogen. The solution is then refluxed for 1½ hours and allowed to cool overnight, whereupon an abundance of potassium carbonate crystallizes out. The solution is filtered and the crystalline filter cake is rinsed with methanol. While cooling the filtrate with ice it is adjusted with concentrated aqueous and finally with dilute methanolic hydrochloric acid to pH=4 to 5, and then evaporated to dryness under vacuum. The crystalline magma is then converted into potassium chloride by adding hydrochloric acid. The potassium chloride is boiled twice with methanol until it no longer contains any organic material, and the same methanol is used to elute the 11-methoxy - 17α:18β - dihydroxy - 3α:20α-yohimbane-16β-carboxylic acid from the evaporation residue. The latter is repeatedly boiled with methanol, then an equal volume of pyridine is added, the whole is allowed to cool and then filtered. The filtrate is evaporated to dryness under vacuum; on being digested with methanol, the residue furnishes the sparingly soluble hydrochloride of 11-methoxy - 17α:18β - dihydroxy - 3α:20α-yohimbane-16β-carboxylic acid melting at 249–253° C.

6.0 g. of dicyclohexyl-carbodiimide are added to a solution of 8.0 g. of 11-methoxy-17α:18β-dihydroxy-3α:20α-yohimbane-16β-carboxylic acid hydrochloride in 400 ml. of pyridine and the whole is stirred and heated for 3 hours at 100° C. The batch is cooled and the solution evaporated to dryness under vacuum. The residue is agitated for 5 minutes with 120 ml. of ice-cold 2 N-acetic acid, whereupon the lactone passes into solution and the dicyclohexylurea remains in crystalline form. It is suctioned off and extracted again in identical manner with 2 x 40 ml. of 2 N-acetic acid, the filter residue being washed each time with 2 N-acetic acid and finally with water. Further acetic acid extracts of the urea prove negative in the Majer test. The acetic acid solutions, which are continuously cooled with ice, are combined. On addition of 6 ml. of concentrated aqueous ammonia (with the pH value of the solution rising from about 2.5 to about 5) smeary impurities are first precipitated. The solution is then decanted from the smeary substances sticking to the wall of the vessel and while thoroughly cooling the solution it is mixed with concentrated ammonia solution (about 30 ml.) until a pH value of 8 to 9 has been established. During this operation the 16:18-lactone of 11 - methoxy - 17α:18β - dihydroxy - 3α:20α-yohimbane-16β-carboxylic acid precipitates in yellow flocks which are left to themselves for a short time at 0° C., then suctioned off, thoroughly washed with water and then suction-filtered in air until they are dry. The afore-mentioned smeary substances are redissolved in 2 N-acetic acid, and by the identical selective precipitation method the residual occluded 16:18-lactone is obtained. The lactone precipitations can be purified by digestion with acetone. By solution in pyridine, evaporation of the solvent under vacuum and taking up the amorphous (or partially crystalline) product in hot acetone the 16:18-lactone of 11-methoxy - 17α:18β - dihydroxy - 3α:20α-yohimbane-16β-carboxylic acid can be purified. It melts at 259–263° C. Optical rotation $[\alpha]_D^{25} = 125° \pm 1°$ (pyridine; c.=1). Its hydrochloride melts at 266–270° C. with decomposition.

A solution of 5.0 g. of the 16:18-lactone of 11-methoxy - 17α:18β - dihydroxy - 3α:20α-yohimbane-16β-carboxylic acid in 150 ml. of formic acid of 88% strength is stirred and refluxed for 40 minutes under nitrogen. The formic acid is then completely expelled by evaporation with acetone and toluene, and after treatment with acetone there is obtained the 16:18-lactone (which is substantially free from the formyl derivative) of 11-methoxy - 17α:18β - dihydroxy - 3β:20α-yohimbane-16β- carboxylic acid (pseudoreserpic acid lactone) which is recrystallized from methanol to furnish handsome needles melting at 274–276° C. Optical rotation $$[\alpha]_D^{25} = +71.8 \pm 1.2°$$

(pyridine; c.=0.8). Its hydrochloride melts at 278–281° C. with decomposition.

0.917 g. of thoroughly dried pseudoreserpic acid lactone are dissolved with stirring at room temperature in 75 ml. of methanol containing 350 mg. of sodium methylate and kept overnight. The pH of the solution is adjusted to 7 with 7 ml. of about 0.5 N-methanolic hydrochloric acid and then evaporated to dryness under vacuum. The residue is distributed between chloroform and about 0.1 N-sodium hydroxide solution while cooling with ice; the chloroform phase is washed with water, dried with sodium sulfate and evaporated to dryness under vacuum. The residue (0.915 g.) is treated with methanol, whereupon methylpseudoreserpate crystallizes spontaneously in the form of handsome, colorless needles melting at 242–245° C. Optical rotation $[\alpha]_D^{25} = 115.4° \pm 3.3°$ (pyridine; c.=0.3).

Example 2

500 mg. of pseudoreserpic acid methyl ester dried in a high vacuum at 120° C. are dissolved in 10 ml. of anhydrous pyridine. A solution of 590 mg. of 3:4:5-trimethoxy-benzoyl chloride in 8 ml. of anhydrous pyridine is added with cooling (in an ice-bath) and the whole allowed to stand for 48 hours at room temperature with the exclusion of light and moisture. The reaction mixture is then freed from pyridine by repeated evaporation with toluene under vacuum (bath temperature 30–40° C.). The residue is dissolved in 50 ml. of chloroform and the solution extracted rapidly with ice-cold 0.5 N-sodium hydroxide solution. The volume of the sodium hydroxide solution is calculated so that the aqueous phase has finally a pH value of about 9 (about 9 ml.) The chloroform phase is then agitated twice with 25 ml. of ice-cold water each time. The aqueous phases (sodium hydroxide fraction and washings) are agitated successively twice more with 25 ml. of chloroform each time. Finally, the chloroform phases are combined, dried with anhydrous sodium sulfate, filtered, and evaporated to dryness in vacuo, a brown resin being obtained. The latter can be purified in a simple manner by being dissolved in a mixture of 9 parts by volume of benzene and 1 part by volume of chloroform and filtered through a column of 60 grams of neutral aluminum oxide (activity II–III). If elution is continued with the same mixture, a small quantity of colorless oil is obtained. If the content of chloroform is increased (mixtures of 8 to 2 parts of benzene and 2–8 parts of choloroform respectively), eluates are obtained which crystallize spontaneously after the solvent has been eliminated by the addition of ethanol. The substance is identical with authentic pseudoreserpine as regards its infrared, ultraviolet and magnetic nuclear resonance spectra.

Example 3

1.20 grams of the hydrochloride of pseudoreserpic acid methyl ester dried at 120° C. in a high vacuum are suspended in 20 ml. of dry pyridine. A solution of 1.20 grams of 3:4-dimethoxybenzoyl chloride in 20 ml. of dry pyridine is then added. The initially pale mixture becomes slowly darker in color and pseudoreserpic acid methyl ester hydrochloride dissolves in the course of about one hour with occasional shaking. The reaction mixture is allowed to stand for 48 hours at room temperature with the exclusion of light and moisture, and the pyridine is then removed by repeated evaporation with toluene in vacuo (bath temperature 30–40° C.). The residue is dissolved in 100 ml. of chloroform and shaken with ice-cold 0.5 N-sodium hydroxide solution (about 25 ml.; pH about 9). The phases are washed with water as described in Example 2, re-extracted with chloroform and the combined organic phases dried with anhydrous sodium sulfate to yield 2.25 grams of resinous residue which can be converted into the pure crystallizate by treatment with aluminum oxide as described in Example 2. A column of 200 grams of adsorbent is used for this purpose. From the eluate obtained with a mixture of benzene and chloroform (9:1) a mixture is obtained which contains the desired substance to about 50% and is then subjected again to the same purification process. The eluates richer in chloroform (benzene 8 to 2 parts and chloroform 2 to 8 parts) lead to the crystalline, pure alkaloid. The 18-O-(3:4-dimethoxybenzoyl)-pseudoreserpic acid methyl ester has a melting point of 204–205° C. (Kofler heater) and crystallizes in the form of colorless needles which contain half a mol of water of crystallization. The ester has an optical rotation: $[\alpha]_D -69.8° \pm 1°$ [in chloroform (c.=0.94)]. Its ultraviolet spectrum displays pronounced maxima at 223 mμ ($\epsilon$=54,400), 264 mμ ($\epsilon$=18,400) and 297 mμ ($\epsilon$=13,200). The infrared spectrum (in methylene chloride) is characterized by a triple band at 2.72; 2.78 and 2.88μ, a double band at 3.40 and 3.51μ and a strong absorption band at 5.84μ which has a pronounced shoulder at 5.80μ. Further strong bands are visible at 6.13; 6.23; 6.61; 6.83; 7.42; 8.18; 8.48; 8.82; 9.75 and 10.25μ.

Example 4

500 mg. of pseudoreserpic acid methyl ester dried in a high vacuum are dissolved in 16.6 ml. of dry pyridine, the solution is cooled and treated with 255 mg. of 3:4-methylenedioxybenzoyl chloride. The whole is allowed to stand for 24 hours at room temperature with the exclusion of light and moisture; 255 mg. of the same acid chloride are then added and the bath allowed to stand for another 24 hours, then worked up as described in Example 2 to yield 958 mg. of residue from the chloroform phase. The latter is purified by filtration through aluminum oxide (90 grams of alumina, activity II–III, neutral). The benzene+chloroform (9:1) eluate yields an oil. If elution is then performed with chloroform, 0.6 gram of residue is obtained which yields 0.37 gram of crude crystallizate from ethanol which, on being recrystallized from ethanol and treated with carbon yields 178 mg. of pure alkaloid. The mother liquor is again subjected to purification with alumina (as described in Example 3) to yield another 78 mg. of pure crystallizate. 18-O-(3:4-methylenedioxybenzoyl)-pseudoreserpic acid methyl ester has a melting point of 206–207° C. (Kofler heater) and crystallizes in the form of fine needles. It has an optical rotation: $[\alpha]_D -72.3° \pm 1°$ [in chloroform (c.=0.98)]. Its ultraviolet spectrum displays pronounced maxima at 224 mμ ($\epsilon$=57,600), 265 mμ ($\epsilon$=14,800) and 299 mμ ($\epsilon$=15,600). The infrared spectrum (in methylene chloride) is characterized by two double bands at 2.78 and 2.88μ and at 3.43 and 3.50μ. In addition, it has a strong absorption band at 5.84μ which shows a pronounced shoulder at 5.80μ. Further strong bands are visible at 6.13; 6.71; 6.94; 7.61; 8.16; 8.33; 8.65; 9.05; 9.30; 9.62 and 10.27μ.

Example 5

1.50 grams of pseudoreserpic acid methyl ester hydrochloride dried in a high vacuum at 120° C. are suspended in 25 ml. of dry pyridine. A solution of 1.60 grams of carbethoxysyringic acid chloride in 25 ml. of dry pyridine is then added; the batch is shaken occasionally, the initially pale mixture slowly becoming darker. The pseudoreserpic acid methyl ester hydrochloride dissolves in the course of about one hour. The mixture is allowed to stand for 48 hours at room temperature with the exclusion of light and moisture, the pyridine is removed by repeated evaporation with toluene in vacuo (bath temperature: 30–40° C.). The residue is dissolved in 100 ml. of chloroform and shaken with ice-cold 0.1 N-sodium hydroxide solution (about 120 ml., pH 8–9). Washing is performed with water as described in Example 2 and re-extraction with chloroform; the combined organic phases are dried with anhydrous sodium sulfate to yield a resinous residue which can be converted into the pure crystallizate by treatment with alumina as described in Example 2. A column of 280 grams of adsorbent is used for the purpose. The eluate obtained with a mixture of benzene and chloroform (9:1) and the first part of the following eluate with a mixture (8:2) yield a mixture consisting to about 50% of the desired substance. The latter is then subjected again to the same purification process. The eluates richer in chloroform (benzene 8 (second part) to 2 parts and chloroform 2 to 8 parts) lead to the crystalline, pure substance.

18-O-(O-carbethoxysyringoyl)-pseudoreserpic acid methyl ester has a melting point of 168–169° C. (Kofler heater) and crystallizes in the form of colorless needles. It has an optical rotation: $[\alpha]_D$ —62.0°±1° [in chloroform (c.=0.96)]. Its ultraviolet spectrum displays maxima at 212 m$\mu$ ($\epsilon$=61,600), 259 m$\mu$ ($\epsilon$=16,400) and 299 m$\mu$ ($\epsilon$=10,000). The infrared spectrum (in methylene chloride) is characterized by double bands at 2.76 and 2.85$\mu$ and at 3.38 and 3.48$\mu$. In addition, it has two very strong absorption bands at 5.64 and 5.78$\mu$. Further strong bands are visible at 6.11/6.20; 6.65; 6.82; 7.44/7.48; 8.28; 8.43; 8.79; 9.49; 9.69 and 10.22$\mu$.

What is claimed is:

1. A process for the manufacture of a compound selected from the group consisting of a 17α-hydroxy-18β-RO-20α-yohimbane-16β-carboxylic acid ester, in which R represents the acyl radical of an at least disubstituted benzoic acid, an N-oxide thereof and a salt of these compounds, which comprises reacting a member selected from the group consisting of a 17α:18β-dihydroxy-20α-yohimbane-16β-carboxylic acid ester, an N-oxide thereof and a salt of such compounds with a member selected from the group consisting of an anhydride and a halide of an at least disubstituted benzoic acid.

2. A process for the manufacture of a compound selected from the group consisting of a 17α-hydroxy-18β-RO-20α-yohimbane-16β-carboxylic acid ester, in which R represents the acyl radical of an at least disubstituted benzoic acid, an N-oxide thereof and a salt of these compounds, which comprises reacting a member selected from the group consisting of a 17α:18β-dihydroxy-20α-yohimbane-16β-carboxylic acid ester, an N-oxide thereof and a salt of such compounds with a chloride of an at least disubstituted benzoic acid.

3. Process as claimed in claim 1, wherein 1.5 to 2.2 mols of the anhydride or halide are reacted with 1 mol of the yohimbane compound.

4. Process as claimed in claim 2, wherein 1.5 to 2.2 mols of the benzoic acid derivative are reacted with 1 mol of the yohimbane compound.

5. Process for the manufacture of yohimbane compounds, which comprises reacting a member selected from the group consisting of a compound of the formula

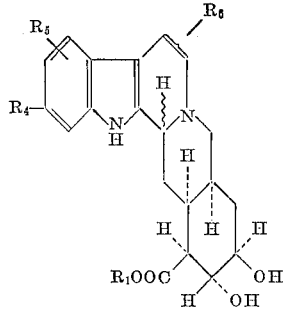

in which $R_1$ stands for a member selected from the group consisting of lower alkyl, lower alkoxy-lower alkyl, di-lower alkylamino-lower alkyl, alkyleneimino-lower alkyl and alkyleneimino-lower alkyl interrupted by a member selected from the group consisting of oxygen, sulfur and nitrogen, $R_4$ and $R_5$ each stands for a member selected from the group consisting of hydrogen, hydroxyl, lower alkoxy, lower alkyl, lower alkylmercapto, phenyl-lower alkoxy, amino, mono-lower alkylamino, di-lower akylamino and halogen, and, when taken together stand in vicinal position for methylenedioxy and $R_6$ stands for a member selected from the group consisting of hydrogen and lower alkyl, an N-oxide thereof and a salt of such compounds with a member selected from the group consisting of an anhydride and a halide of a benzoic acid at least disubstituted by members selected from the group consisting of lower alkyl, hydroxyl, lower alkoxy, methylenedioxy, lower alkanoyloxy, lower alkoxycarbonyloxy, aminocarbonyloxy, mono-lower alkylamino-carbonyloxy, di-lower alkylaminocarbonyloxy, phenylaminocarbonyloxy, amino, mono-lower alkylamino, di-lower alkylamino, lower alkanoyl-amino, lower alkoxy-carbonylamino, phenylazo, nitro, carboxy, carbo-lower alkoxy, carbamyl, halogen and trifluoromethyl.

6. Process as claimed in claim 5, wherein 1.5 to 2.2 mols of the benzoic acid derivative are reacted with 1 mol of the yohimbane compound.

7. Process as claimed in claim 5, wherein a lower alkyl-pseudoreserpate is reacted with a member selected from the group consisting of a halide and an anhydride of 3:4:5-trimethoxy benzoic acid, 3:4-dimethoxy-benzoic acid, 3:4-methylenedioxy benzoic acid and O-carbethoxy syringic acid.

8. Process as claimed in claim 7, wherein methyl pseudoreserpate is reacted with a member selected from the group consisting of the anhydride and a halide of 3:4:5-trimethoxybenzoic acid.

9. Process as claimed in claim 7, wherein methyl pseudoreserpate is reacted with a member selected from the group consisting of the anhydride and a halide of 3:4-dimethoxybenzoic acid.

10. Process as claimed in claim 7, wherein methyl pseudoreserpate is reacted with a member selected from the group consisting of the anhydride and a halide of 3:4-methylenedioxybenzoic acid.

11. Process as claimed in claim 7, wherein methyl pseudoreserpate is reacted with a member selected from the group consisting of the anhydride and a halide of O-carbethoxysyringic acid.

References Cited by the Examiner

UNITED STATES PATENTS 2,964,451  12/1960  Pan et al. _____ 260—236
3,022,311  2/1962  Weisenborn _____ 260—236

FOREIGN PATENTS 833,149  4/1960  Great Britain.

OTHER REFERENCES

Huebner et al.: Jour. Amer. Chem. Soc., vol. 79 (1957), pages 250 and 251.

Klohs et al.: Jour. Amer. Chem. Soc., vol. 79 (1957), pages 3763–3766.

Van Tamelen et al.: Jour. Amer. Chem. Soc., vol. 79 (1957), pages 5256–5262.

WALTER A. MODANCE, *Primary Examiner.*

NICHOLAS S. RIZZO, *Examiner.*

JAMES A. PATTEN, *Assistant Examiner.*